(12) United States Patent
Grimm et al.

(10) Patent No.: US 7,380,643 B2
(45) Date of Patent: Jun. 3, 2008

(54) BRAKE ASSEMBLY, PARTICULARLY FOR A HYDRAULIC WHEEL DRIVE

(75) Inventors: Raimund Grimm, Iserlohn (DE); Bernhard Langenbeck, Dortmund (DE)

(73) Assignee: Lohmann & Stolterfoht GmbH (DE)

( * ) Notice: Subject to any disclaimer, the term of this patent is extended or adjusted under 35 U.S.C. 154(b) by 164 days.

(21) Appl. No.: 10/562,492

(22) PCT Filed: Jun. 24, 2004

(86) PCT No.: PCT/EP2004/051232

§ 371 (c)(1),
(2), (4) Date: Dec. 23, 2005

(87) PCT Pub. No.: WO2005/001304

PCT Pub. Date: Jan. 6, 2005

(65) Prior Publication Data

US 2006/0144651 A1   Jul. 6, 2006

(30) Foreign Application Priority Data

Jun. 27, 2003   (DE) ................................ 103 29 047

(51) Int. Cl.
*F16D 55/36* (2006.01)
*F16D 55/22* (2006.01)
*F16D 65/22* (2006.01)

(52) U.S. Cl. .................. 188/71.5; 188/72.3; 188/72.4; 188/73.2; 188/170

(58) Field of Classification Search ............... 188/71.5, 188/170, 72.1, 72.3, 73.1, 73.2, 72.4
See application file for complete search history.

(56) References Cited

U.S. PATENT DOCUMENTS

| 3,599,761 | A | * | 8/1971 | Schultz et al. ............... 188/170 |
| 3,946,837 | A | * | 3/1976 | Houser ....................... 188/170 |
| 4,279,330 | A | * | 7/1981 | Pottorff et al. .............. 188/170 |
| 4,723,636 | A | | 2/1988 | Lallier |
| 5,050,710 | A | * | 9/1991 | Bargfrede ................... 188/71.6 |
| 6,264,009 | B1 | * | 7/2001 | Johnson ..................... 188/71.5 |
| 6,543,222 | B1 | | 4/2003 | Case et al. |
| 2002/0045510 | A1 | * | 4/2002 | Damm et al. ............... 188/71.5 |

FOREIGN PATENT DOCUMENTS

| DE | 198 57 962 | | 12/1998 |
| DE | 19857962 | A1 * | 6/2000 |
| EP | 1072814 | | 7/2000 |
| EP | 1167140 | | 6/2001 |

\* cited by examiner

*Primary Examiner*—Thomas J Williams
(74) *Attorney, Agent, or Firm*—Jack Schwartz & Associates, PLLC

(57) ABSTRACT

A brake assembly, in particular of a hydraulic wheel drive, comprising a disk package formed of a plurality of outer disks and corresponding inner disks, and compressible a piston assembly for braking. A first hydraulic cycle acts on the piston assembly for driving braking and a second hydraulic cycle acts on the piston assembly for parking braking. The piston assembly includes a driving brake piston which contacts the disk package and is able to be pressurized by the first hydraulic cycle and also able to be pressurized by an adjacent separate parking brake piston interacting with the second hydraulic cycle.

6 Claims, 1 Drawing Sheet

BRAKE ASSEMBLY, PARTICULARLY FOR A HYDRAULIC WHEEL DRIVE

FIELD OF THE INVENTION

The present invention relates to a brake assembly, in particular for a hydraulic wheel drive, comprising a disk package formed of a plurality of outer disks and corresponding inner disks and compressible by means of a piston assembly for braking, wherein a first hydraulic cycle acts on the piston assembly for driving braking and a second hydraulic cycle acts on the piston assembly for parking braking.

The field of use of the present invention is primarily in the agricultural machine industry. Agricultural vehicles are often equipped with wheel drives comprising a hydraulic motor as a drive unit having downstream of it a planetary gear drive having a compact structure as a gearbox stage having its ring gear directly coupled to the wheel hub. A vehicle equipped with a wheel drive of this type has on the one hand a so-called dynamic brake which enables the driver to brake or stop the vehicle during driving. Apart from this, a static brake is also necessary, which can be used as a parking brake in order to secure the vehicle during standstill.

BACKGROUND OF THE INVENTION

From EP 1 167 140 A2 a wheel drive of this type is known, in which both a driving brake and a parking brake are integrated. Here, the parking brake is provided on the side of the drive input of the planetary gearbox and is effective between a stationary carrying axle on the one hand and a sun gear shaft of the planetary gearbox on the other. The driving brake, however, is arranged on the side of the drive output of the planetary gearbox and is effective between the ring gear also serving as a gear hub on the one hand and the correspondingly extended carrying axle on the other. Each brake is driven by a hydraulic cycle and each essentially comprises a disk package which is actuated by a pressure spring in the case of the parking brake and by means of a pressurized medium in the case of the driving brake. The incorporation of both the driving brake and the parking brake in the wheel drive needs considerable structural space, in particular due to the two disk packages, each having their associated actuating means.

From EP 0 913 304 A2 a wheel drive is known, in which this drawback is eliminated in that a common disk package is provided for both the driving brake and the parking brake. The disk package is operated by means of a separate hydraulic cycle for the driving brake and by means of another, separately formed, hydraulic cycle for the parking brake. However, both hydraulic cycles act on one and the same piston to compress the disk package for braking.

A drawback of this approach is that such a common operation of the single braking piston is a security hazard, since a system redundancy is largely done without. If the common brake piston fails, the functioning of the brake is no longer ensured, even if it is driven by means of the other hydraulic cycle. Moreover, according to statutory regulations in many countries, a parking brake without a spring action is not allowed.

SUMMARY OF THE INVENTION

It is therefore an object of the present invention to provide a brake assembly, in particular for a hydraulic wheel drive, which includes both a driving brake and a parking brake involving minimal structural complexity, wherein a redundant structural principle is largely realized.

This object is achieved on the basis of a brake assembly according to the preamble of claim 1 in combination with its characterizing features. The subsequent dependent claims define advantageous embodiments of the present invention.

The present invention includes the technical teaching that the piston assembly actuating a common disk package comprises a driving brake piston which is in contact with the disk package and pressurized by a first hydraulic cycle and which can also be pressurized by an adjacent separate parking brake piston interacting with the second hydraulic cycle.

The advantage of the approach according to the present invention is in particular that despite using a common disk package, in principle two separate brakes, i.e. a driving brake and a parking brake, are implemented, which are separately driveable via separate hydraulic cycles. By using a common disk package and the unique piston assembly, the overall result is a space-saving design while maintaining the functional safety of the brakes.

Preferably the parking brake piston of the piston assembly has an annular configuration and is coaxial with the driving brake piston, also having an annular configuration. In particular when used as a wheel drive in which the gearbox is configured in the manner of a planetary gearbox, such an annular configuration of the piston assembly has proved to be particularly space-saving.

According to another advantageous embodiment of the present invention, it is suggested that the parking brake piston be arranged on the outer periphery of the driving brake piston and be in contact with an outer radial shoulder of the driving brake piston in the axial direction of the disk package, in order to transmit the parking brake force to the driving brake piston. Herein the effective surface formed by the shoulder of the driving brake piston need not be particularly large. Calculations have shown that a relatively small shoulder can provide an annular surface of sufficient size as an effective surface for the driving brake piston, since the driving brake piston has a relatively large diameter. The shoulder of the driving brake piston thus serves on the one hand as a contact surface for transmitting the parking brake force originating from the parking brake piston to the disk package via the driving brake piston. On the other hand, the shoulder also forms an effective surface of the driving brake piston.

The effective surface formed by the shoulder of the driving brake piston is preferably pressurized by the brake pressure, i.e. the pressurized medium, from the first hydraulic cycle, via a radial bore extending through the parking brake piston. Corresponding radial seals must be provided on the side of the driving brake piston and of the parking brake piston.

However, the parking brake piston is preferably actuated by means of at least one pressure spring and reset by means of the pressurized medium of the second hydraulic cycle. The safety function is ensured via the actuation by means of pressure springs automatically triggering the parking brake when any of the hydraulic cycles fail. Moreover, no pressure need be maintained in the hydraulic cycles during extended standstill of the vehicle in order to securely hold the vehicle in the parking position.

The driving brake piston can be actuated by means of the pressurized medium of the first hydraulic cycle and is reset by means of at least one pressure spring. Therefore, if brake pressure is not applied to the driving brake piston, it assumes its non-actuated starting position, i.e. the disk package is not compressed, if it cannot be pressurized by the pressure springs of the parking brake.

Further advantageous embodiments of the present invention are described in more detail in the following together with a preferred exemplary embodiment with reference to the single FIGURE.

DETAILED DESCRIPTION OF THE INVENTION

Figure 1:
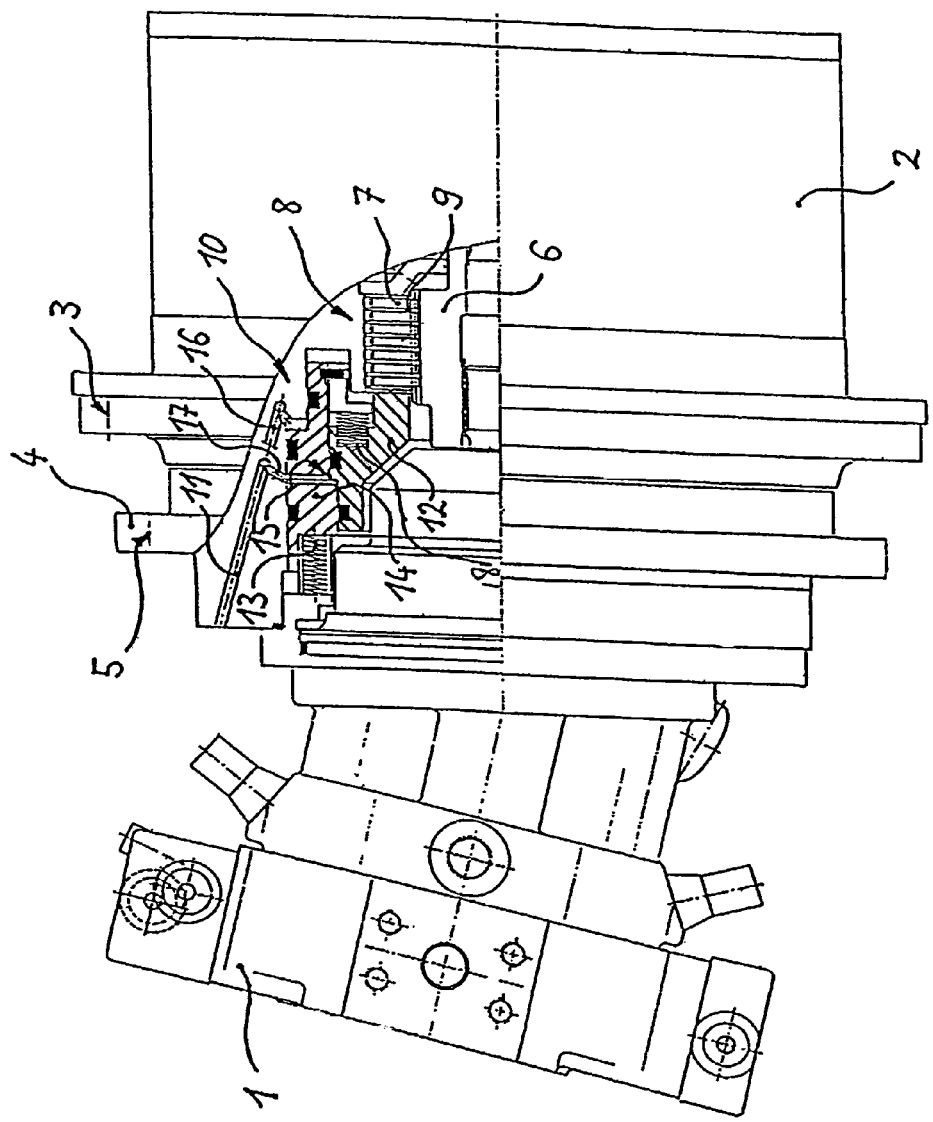
FIG. 1 shows a partial longitudinal sectional view of hydraulic wheel drive equipped with a brake assembly.

The wheel drive essentially comprises a hydraulic motor 1 which is flanged to a planetary gearbox 2 having bores 3 provided on its housing for attaching a vehicle wheel (not shown). The wheel drive further comprises a carrying axle 4 having outer radial bores 5 enabling the whole of the wheel drive to be mounted on the vehicle (not shown).

On the drive input side of the planetary gearbox 2, on a driving shaft 6 interacting with the hydraulic motor 1, inner disks 7 of a disk package 8 are arranged. The inner disks 7 interact with outer disks 9 of the disk package 8 fixed with respect to the carrying axle 4 and narrower in structure with respect to the latter.

For braking the disk package 8 is compressible by means of a piston assembly 10. The piston assembly 10 comprises a driving brake piston 12 able to be pressurized by a first hydraulic cycle 11, and a parking brake piston 14 able to be pressurized by means of a plurality pressure springs 13 in an annular arrangement. Both the parking brake piston 14 and the driving brake piston 12 have an annular configuration and surround a portion of the hydraulic motor 1 extending through them. The parking brake piston 14 is arranged on the outer periphery of the driving brake piston 12. The parking brake piston 14 contacts an outer radial shoulder 15 formed on the driving brake piston 12 in the axial direction of the disk package 8 in order to transmit the parking brake force generated by the pressure springs 13 to the disk package 8 via the driving brake piston 12. During the operation of the hydraulic motor 1, i.e. while the vehicle is travelling, the parking brake is out of operation due to reverse pressurizing of the parking brake piston 14 by the second hydraulic cycle 16 counteracting the force of the pressure springs 13.

Moreover, the outer radial shoulder 15 of the driving brake piston 12 also forms the effective surface of the driving brake piston 12 which is supplied with brake pressure via a radial bore 17 which also radially extends through the parking brake piston 14. The radial bore 17 is a part of the first hydraulic cycle 11. The driving brake piston 12 is resettable by means of a plurality of pressure springs 18 arranged along the periphery of the annular driving brake piston 12 and bearing against the carrying axle 4.

| List of reference numerals |
|---|
| 1 hydraulic motor |
| 2 planetary gearbox |
| 3 bores |
| 4 carrying axle |
| 5 bores |
| 6 driving shaft |
| 7 inner disks |

| List of reference numerals |
|---|
| 8 disk package |
| 9 outer disks |
| 10 piston assembly |
| 11 first hydraulic cycle |
| 12 driving brake piston |
| 13 pressure spring |
| 14 parking brake piston |
| 15 shoulder |
| 16 second hydraulic cycle |
| 17 bore |
| 18 pressure spring |

The invention claimed is:

1. A brake assembly, particular for a hydraulic wheel drive, comprising a disk package formed of a plurality of outer disks and corresponding inner disks, which is hydraulic cycle acts on a piston assembly for driving braking and first hydraulic cycle acts on the piston assembly for parking braking, wherein said piston assembly comprises a driving brake piston which is in contact with said disk package and is able to be pressurized by said first hydraulic cycle and also able to be pressurized by means of an adjacent parking brake piston interacting with a second hydraulic cycle;

wherein said parking brake piston has an annular configuration and is arranged coaxially with the driving brake piston also having an annular configuration;

said parking brake piston is arranged on the outer circumference of said driving brake piston and contacts an outer radial shoulder of said driving brake piston in the axial direction of said disk package in order to transfer the braking force to the driving brake piston; and said shoulder also forms the effective surface of said driving brake piston able to be pressurized with the brake pressure via a radial bore in the parking brake piston.

2. The brake assembly according to claim 1, wherein said parking brake piston is able to be actuated by means of at least one pressure spring and resettable by means of the pressurized medium of said second hydraulic cycle.

3. The brake assembly according to claim 1, wherein said driving brake piston is able to be actuated by means of the pressurized medium of said first hydraulic cycle and resettable by means of at least one pressure spring.

4. The brake assembly according to claim 1, wherein said disk package is arranged, on a drive input side, within a planetary gearbox.

5. The brake assembly according to claim 3, wherein on a drive input side of said planetary gearbox a hydraulic motor is provided which forms a wheel drive together with a planetary gearbox.

6. A brake assembly, in particular for a hydraulic wheel drive, comprising a disk package formed of a plurality of outer disks and corresponding inner disks, and a piston assembly including a driving brake piston in contact with said disk package and a parking brake piston, said brake assembly operating in a first hydraulic cycle acting to pressurize said driving brake piston of said piston assembly for driving braking and a second hydraulic cycle in which said parking brake piston pressurizes said driving brake piston on the piston assembly for parking braking,;

wherein said parking brake piston has an annular configuration and is arranged coaxially with the driving brake piston also having an annular configuration;

said parking brake piston is arranged on the outer circumference of said driving brake piston and contacts an outer radial shoulder of said driving brake piston in the axial direction of said disk package in order to transfer the braking force to the driving brake piston; and said shoulder also forms the effective surface of said driving brake piston able to be pressurized with the brake pressure via a radial bore in the parking brake piston.

* * * * *